(12) United States Patent  (10) Patent No.: US 12,393,210 B2
Akerele  (45) Date of Patent: Aug. 19, 2025

(54) PNEUMATIC PROPULSION DEVICE FOR EFFICIENT HAIR ACTIVE DEPOSITION AND APPLICATION

(71) Applicant: L'Oreal, Paris (FR)

(72) Inventor: Dominic Akerele, Brooklyn, NY (US)

(73) Assignee: L'Oreal, Paris (FR)

( * ) Notice: Subject to any disclaimer, the term of this patent is extended or adjusted under 35 U.S.C. 154(b) by 479 days.

(21) Appl. No.: 17/900,602

(22) Filed: Aug. 31, 2022

(65) Prior Publication Data

US 2024/0069579 A1  Feb. 29, 2024

(51) Int. Cl.
  G05D 11/13  (2006.01)
  A45D 34/00  (2006.01)
  A45D 40/00  (2006.01)

(52) U.S. Cl.
  CPC ............. G05D 11/13 (2013.01); A45D 34/00 (2013.01); A45D 40/00 (2013.01)

(58) Field of Classification Search
  CPC ......... G05D 11/13; A45D 34/00; A45D 40/00
  See application file for complete search history.

(56) References Cited

U.S. PATENT DOCUMENTS 5,820,853 A * 10/1998 Glandorf ................ A61Q 11/00
  424/57
2013/0302392 A1* 11/2013 Mistry ................ A61K 8/8152
  510/516
2016/0143408 A1  5/2016 Grez
2019/0053604 A1*  2/2019 Bardon ................... A61K 8/898
2020/0206699 A1*  7/2020 Han ........................ B01F 25/103

FOREIGN PATENT DOCUMENTS

EP  1421997 A1  5/2004
EP  4029600 A1  7/2022
FR  2970403 A1  7/2012
FR  3055779 A1  3/2018

OTHER PUBLICATIONS

Search Report and Written Opinion issued May 17, 2023, issued in corresponding French Application No. 2211101, filed Oct. 26, 2022, 7 pages.

* cited by examiner

Primary Examiner — Jeremy Carroll
(74) Attorney, Agent, or Firm — CHRISTENSEN O'CONNOR JOHNSON KINDNESS PLLC (57) ABSTRACT

A dispensing device, including a housing configured to surround the dispensing device, a first connection configured to connect to a water source, a second connection configured to connect to a gas source, a formula reservoir configured to hold one or more formulas, a mixing zone configured to mix water from the water source, and gas from the gas source, and formula from the formula reservoir into a mixture, a charged substrate configured to coacervate the mixture, and a plurality of openings fluidly coupled to the mixing zone, the plurality of openings configured to deposit a mixture of the one or more formulas, the gas, and the water onto a surface.

15 Claims, 12 Drawing Sheets

PNEUMATIC PROPULSION DEVICE FOR EFFICIENT HAIR ACTIVE DEPOSITION AND APPLICATION

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the present disclosure describes a dispensing device, including a housing configured to surround the dispensing device, a first connection configured to connect to a water source, a second connection configured to connect to a gas source, a formula reservoir configured to hold one or more formulas, a mixing zone configured to mix water from the water source, and gas from the gas source, and formula from the formula reservoir into a mixture, a charged substrate configured to enable coacervation of the mixture, and an opening fluidly coupled to the mixing zone, the opening configured to deposit a mixture of the one or more formulas, the gas, and the water onto a surface.

In another aspect, a dispensing system including the dispensing device described herein and one or more formulas is disclosed.

In yet another aspect, the present disclosure also describes a method of dispensing a mixture with a dispensing device, the method includes dispensing water from a water source, gas from a gas source into a mixing zone, opening a plurality of valves on a plurality of formula reservoirs, depositing a set amount of each formula of a plurality of formulas into the mixing zone, mixing the water, the gas, and the plurality of formulas to form a mixture, and dispensing the mixture onto a surface.

In another aspect, a method of dispensing a mixture with a dispensing device, the method including dispensing water from a water source, gas from a gas source into a mixing zone, opening a plurality of valves on a plurality of formula reservoirs, depositing a set amount of each formula of a plurality of formulas into the mixing zone, mixing the water, the gas, and the plurality of formulas to form a mixture, passing the mixture over a charged substrate, enabling coacervation in the mixture, and dispensing the mixture onto a surface is disclosed.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1A is an example device, in accordance with the present technology;

FIG. 1B is an internal view of the example device in FIG. 1A, in accordance with the present technology;

FIG. 2A is an internal view of another example device, in accordance with the present technology;

FIG. 2B shows a plurality of formula reservoirs, in accordance with the present technology;

FIG. 3A is another example device, in accordance with the present technology;

FIG. 3B is a perspective view of the example device of FIG. 3A, in accordance with the present technology;

FIG. 3C is an internal view of the example device of FIG. 3A, in accordance with the present technology;

FIG. 4 shows the example device of FIG. 3A connected to an external water source and an external gas source, in accordance with the present technology;

FIG. 5 is an example system, in accordance with the present technology;

FIG. 6 is example formula inside example packaging, in accordance with the present technology;

FIG. 7 is an example recipe, in accordance with the present technology;

FIG. 8 is an example method of dispensing a mixture, in accordance with the present technology;

FIG. 9 is an example method of dispensing a mixture according to a recipe, in accordance with the present technology; and FIG. 10 is an example method of dispensing a mixture according to an identity of one or more formulas, in accordance with the present technology

DETAILED DESCRIPTION

While illustrative embodiments have been illustrated and described, it will be appreciated that various changes can be made therein without departing from the spirit and scope of the invention.

The present disclosure described a device configured to mix water and compressed gas with one or more formulas to make a mixture, pass the mixture over a charged substrate to enable coacervation of the mixture, and deposit the mixture onto a surface. In some embodiments, the mixture is a shampoo, conditioner, leave in shampoo or conditioner, a hair serum, or a hair mask. In some embodiments, the one or more formulas are active ingredients for hair treatment. In some embodiments, the mixture has a high concentration or coacervate molecules that are able to be applied through one or a plurality of openings. In some embodiments, the coacervate molecules improve the cosmetic performance and sensory performance of the mixture, when applied to hair. As a result, a user may achieve softer, smoother, shinier hair, with reduced frizz.

In one aspect, the present disclosure describes a dispensing device, including a housing configured to surround the dispensing device, a first connection configured to connect to a water source, a second connection configured to connect to a gas source, a formula reservoir configured to hold one or more formulas, a mixing zone configured to mix water from the water source, and gas from the gas source, and formula from the formula reservoir into a mixture, a charged substrate, and an opening fluidly coupled to the mixing zone, the opening configured to deposit a mixture of the one or more formulas, the gas, and the water onto a surface.

In some embodiments, the formula reservoir is located in the mixing zone. In some embodiments, the formula reservoir comprises a valve, wherein the valve is configured to release an amount of the formula into the mixing zone. In some embodiments, the formula reservoir is a first formula reservoir of a plurality of formula reservoirs and the valve is a first valve of a plurality of valves, and wherein each formula reservoir of the plurality of formula reservoirs comprises a valve of the plurality of valves and is configured to hold a formula of the one or more formulas.

In some embodiments, the charged substrate is a charged plastic with a metal netting surrounding it. In some embodiments, the dispensing device further includes a processor communicatively coupled to the plurality of valves and configured to direct each valve of the plurality of valves to dispense a specific amount of each formula into the mixing zone. In some embodiments, the processor is communicatively coupled to a smart device.

In some embodiments, the water source is disposed inside the housing. In some embodiments, the gas source is disposed inside the housing.

In some embodiments, the dispensing device further includes an actuator configured to direct the dispensing device to begin mixing the water, the gas, and the one or more formulas.

In another aspect, a dispensing system including the dispensing device described herein and one or more formulas is disclosed.

In some embodiments, the one or more formulas are a liquid, a solid, a gel, a formula disposed within a dissolvable membrane, or combinations thereof. In some embodiments, the one or more formulas are one or more cosmetic ingredients.

In some embodiments, the system further comprises a smart device communicatively coupled to the dispensing device, wherein the smart device is configured to generate a recipe comprising the one or more cosmetic ingredients.

In some embodiments, the one or more formulas is contained in a packaging, and wherein the packaging comprises an ID tag. In some embodiments, the smart phone is further configured to read to ID tag, and determine the recipe based on an identity of the one or more formula.

In yet another aspect, the present disclosure also describes a method of dispensing a mixture with a dispensing device, the method includes dispensing water from a water source, gas from a gas source into a mixing zone, opening a plurality of valves on a plurality of formula reservoirs, depositing a set amount of each formula of a plurality of formulas into the mixing zone, mixing the water, the gas, and the plurality of formulas to form a mixture, and dispensing the mixture onto a surface.

In some embodiments, the method further comprises providing a recipe, wherein the recipe comprises the set amount for each formula of the plurality of formulas to be deposited from the plurality of valves. In some embodiments, the method further comprises loading the device with a one or more formulas. In some embodiments, the method further comprises identifying the plurality of formulas loaded into the device and determining the set amount of each formula based on the identity of the one or more formulas.

In some embodiments, the mixture is a shampoo, a conditioner, a hair mask, a leave in conditioner, a heat treatment, or a leave in shampoo.

Figure 1A:
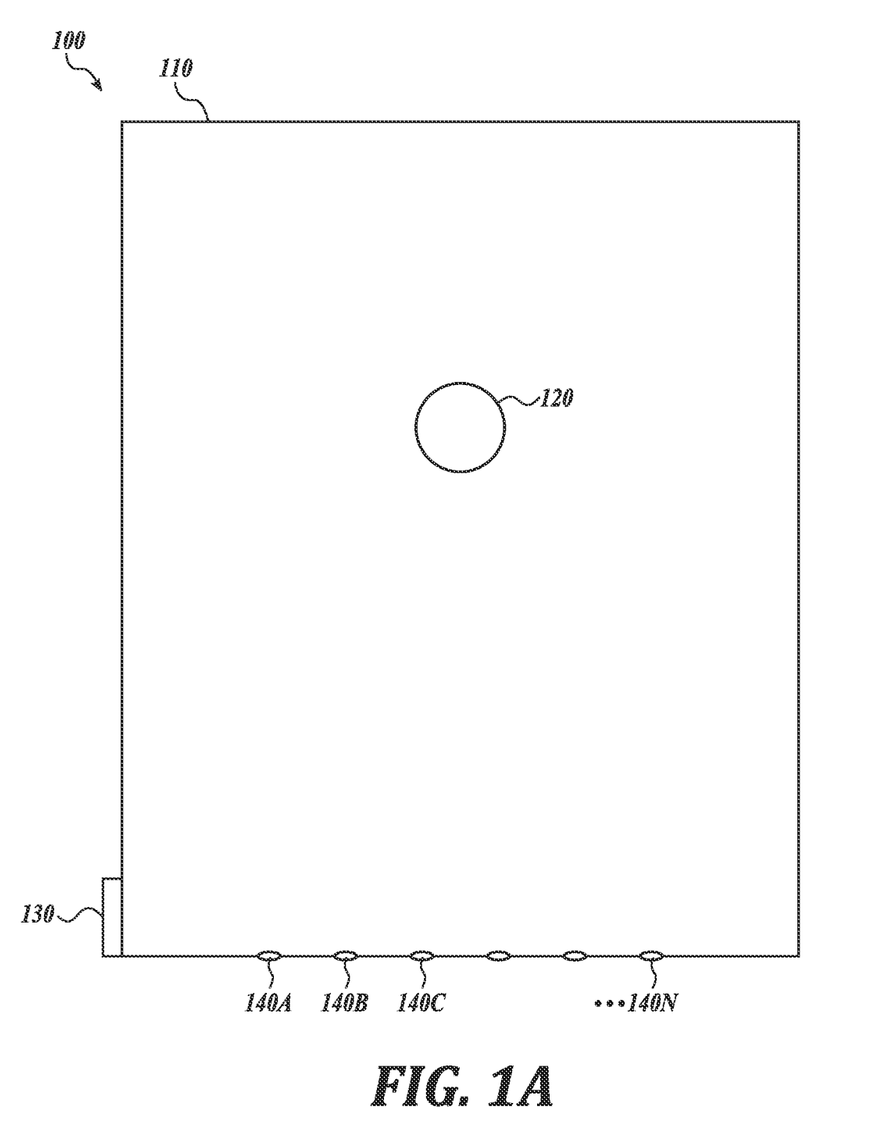
Figure 1B:
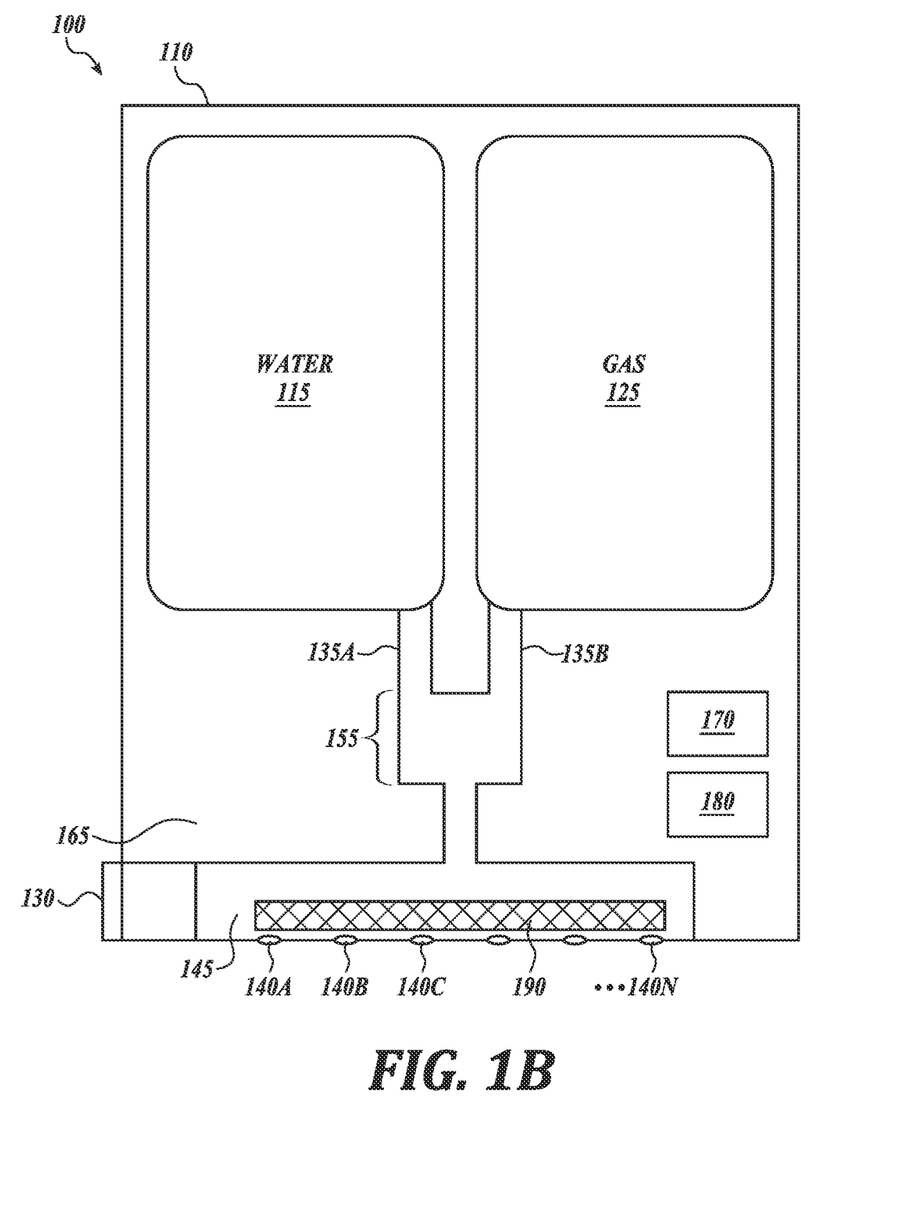
Figure 3A:
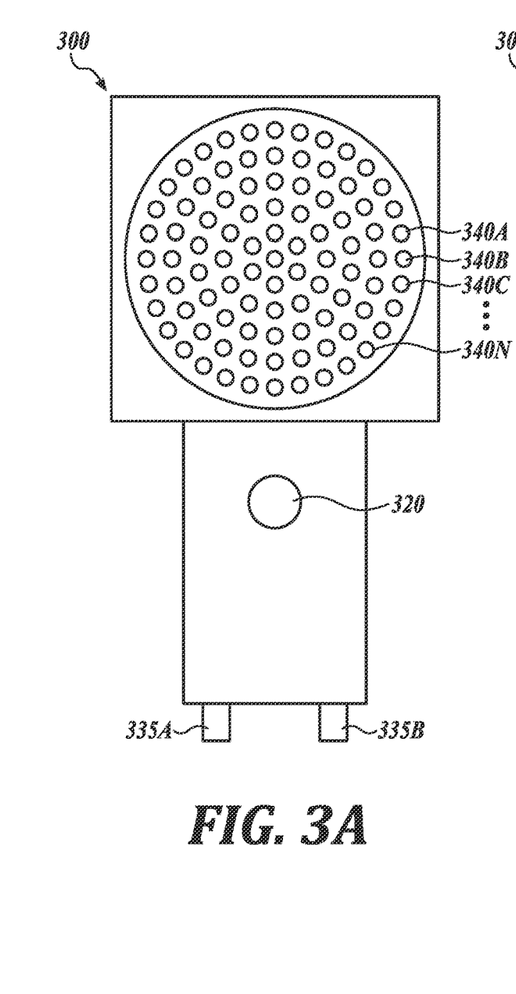
Figure 3B:
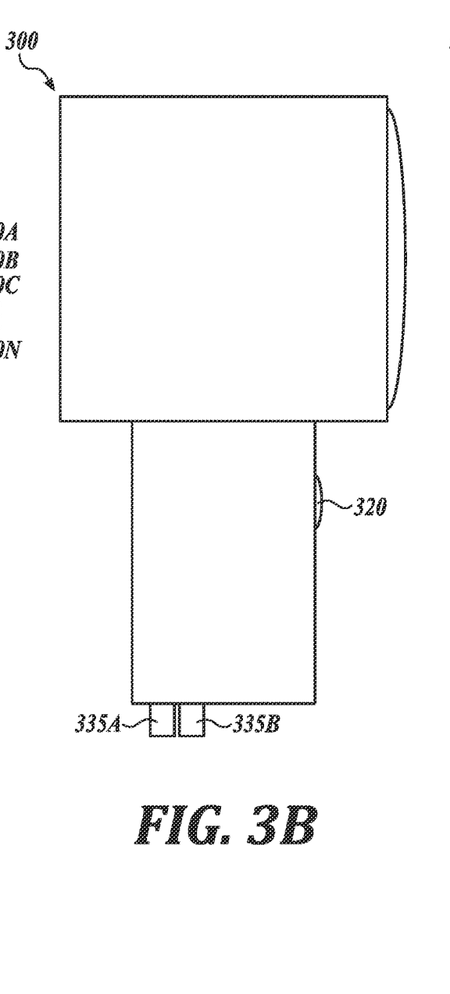
Figure 3C:
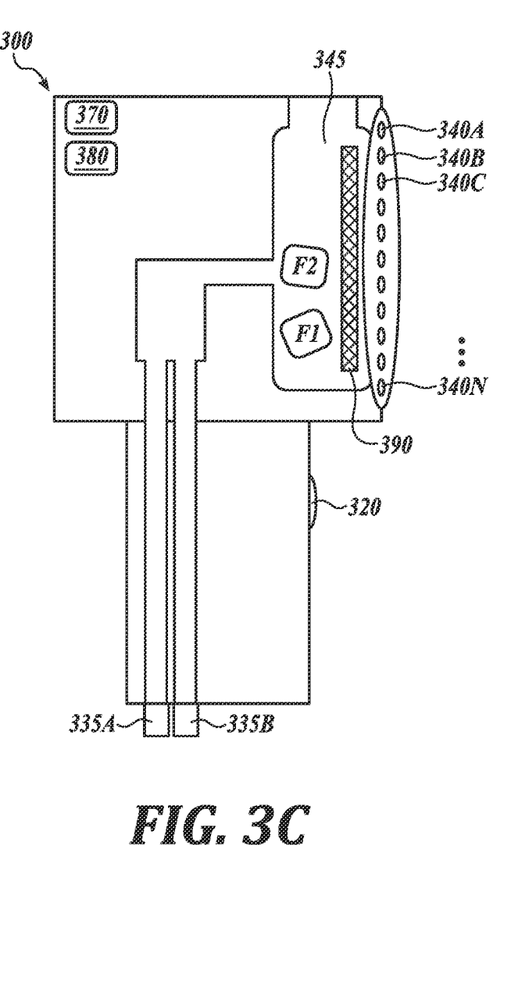

FIG. 1A is an example device, in accordance with the present technology. In some embodiments, the device 100 includes a housing 110, an actuator 120, and a plurality of openings 140A, 140B, 140C . . . 140N. In some embodiments, the device further includes a lid 130 connected to a formula reservoir as shown in FIG. 1B. While the device 100 is illustrated as rectangular, it should be understood that the device 100 and the housing 110 can take any number of form factors, including a device with a handle, as shown in FIGS. 3A-3C, a circular or ovular form factor, an organic shape, or a polygon. In some embodiments, the housing 10 is waterproof. In some embodiments, the housing 110 may be plastic, metal, or rubber.

In some embodiments, the device 100 includes an actuator 120. Though the actuator 120 is illustrated in FIG. 1A as a button on the device 100, in some embodiments, the actuator 120 may take the form of a switch, toggle, touch-type capacitive button, or the like. In still other embodiments, the actuator 120 is a user interface, capable of receiving touch input or button input from a user. In other embodiments, the actuator 120 is not located on the housing 110 and may instead be on a smart device, such as a smartphone or tablet. In operation, a user can press or select the actuator 120 to begin mixing water and gas and eventually deposit a mixture onto a surface, as described in detail herein.

In some embodiments, the device 100 includes a lid 130 or entrance, configured to cover a formula reservoir (as shown in FIG. 1B) where a user may load or unload formula into the device. In some embodiments, the lid 130 may be a raised component, such as a hinged door, but in other embodiments, the lid 130 may be flush with the housing 110 or recessed into the housing 110. In operation, a user or machine can remove the lid 130 to deposit formula into the formula reservoir of the device. In some embodiments, the lid 130 may be a screw on lid, a snap on lid, or the like.

In some embodiments, the device 100 includes a plurality of openings, 140A, 140B, 140C . . . 140N. In some embodiments, the plurality of openings 140A, 140B, 140C . . . 140N are located on a single place of the device 100. In other embodiments, the plurality of opening 140A, 140B, 140C . . . 140N can be on any number of the surfaces of the device 100. In some embodiments, the plurality of openings 140A, 140B, 140C . . . 140N may be holes, but in other embodiments they may be valves. In operation, water, formula, and gas move through the device 100, and are eventually deposited through the plurality of openings 140A, 140B, 140C . . . 140N.

FIG. 1B is an internal view of the example device in FIG. 1A, in accordance with the present technology. In some embodiments, the device 100 further includes a water source 115, a gas source 125, a first connection 135A, a second connection 135B, a formula reservoir 145, a mixing zone 155, a power source 170, a processor 180, and a charged substrate 190.

In some embodiments, the water source 115 and the gas source 125 are disposed within the housing 110 of the device. In some embodiments, the water source 115, the gas source 125, or both are disposed outside of the housing 110, as shown and described in FIGS. 3A-3C. In some embodiments, the water source is a hot water source or a cold-water source, in some embodiments, the water source is a tank of water. In some embodiments, the water source is fully contained within the housing 110. In some embodiments, a portion of the water source 110 may protrude from the housing. In some embodiments, the water source is removable, replaceable, refillable, or a combination thereof.

In some embodiments, the gas source 125 is a $CO_2$ cartridge. In some embodiments, the gas source 125 is removable, replaceable, refillable, or a combination thereof. In some embodiments, the gas source 125 is fully contained within the housing 110, but in other embodiments, a portion of the gas source 125 may protrude from the housing 110.

In operation the water source 115 is configured to dispense water into the first connection 135A. Similarly, the gas source 125 is configured to dispense gas into the second connection 135A. In some embodiments, as the gas and water are dispensed, they mix. In some embodiments, the water and gas mix in a mixing zone 155, as described herein.

In some embodiments, the device further includes a first and second connection 135A, 135B. In some embodiments, the first connection 135A is configured to connect to the water source. In some embodiments, the second connection 135B is configured to connect to the gas source. In some embodiments, the first and second connections 135A, 135B may be valves or pipes connected to their respective sources. In some embodiments, the first and second connections 135A, 135B may be screwed or popped into place. In some embodiments, the first and second connections 135A, 135B may be slid through an opening in the water source 115 or the gas source 125 respectively. In some embodiments, the first and second connection 135A, 135B may be connected to the water and gas sources 115, 125 respectively with a first and second valve. In such embodiments, the first and second valve may be configured to dispense the water and gas into the first and second connection 135A, 135B.

In some embodiments, the device 100 further includes a mixing zone 155. While the mixing zone 135 is illustrated as a reservoir, this is merely an example. In some embodiments, the mixing zone is a continuation of the first and second connections 135A, 135B and configured to mix water and gas as they flow or are directed into the formula reservoir 145. In some embodiments, the mixing zone 155 includes a mechanism for mixing the gas and water, such as a stirrer.

In some embodiments, the device 100 includes a power source 170. In some embodiments, the power source 170 is configured to power the device. In some embodiments, the power source 170 is a battery, a capacitor, or the like. In some embodiments, the power source 170 may have a wired connection, such as a cable configured to plug into an outlet.

In some embodiments, the device 100 includes a processor 180. In some embodiments, the processor 180 is configured to direct the water source 115, the gas source 125, or a combination thereof to dispense water, gas, or both. In some embodiments, the processor directs a specific amount of gas, water, or both to enter the formula reservoir 145. As described herein, in some embodiments, the amount of water and gas may be determined by an identity of the one or more formulas in the device 100, a recipe transmitted to the processor 180, or hardcoded into the processor 180.

In some embodiments, the device 100 further includes a formula reservoir 145. In some embodiments, the formula reservoir 145 is configured to hold one or more formulas. In some embodiments, the formula may be a solid, such as a porous solid, a liquid, a gel, or encapsulated in a dissolvable membrane. As the water and gas enter the formula reservoir 145, the water and gas mix with the formula to form a mixture, which is dispensed out of the plurality of openings 140A, 140B, 140C . . . 140N. In some embodiments, the formulation reservoir is directly above and fluidly coupled to the plurality of openings 140A, 140B, 140C . . . 140N.

In some embodiments, the device 100 further includes a charged substrate. In some embodiments, the charged substrate is a charged plastic with a metal netting. In some embodiments, the charged substrate 190 is configured to enable coacervation of a mixture of one or more formulas, the water, and the gas. In some embodiments, ions from the charged substrate 190 are generated from the heat exchange between the water and compressed gas on the charged surface 190. As such, the mixture of formula, water, and gas the device 100 dispenses contains concentrated coacervated cationic actives.

In operation, water and gas are mixed together and deposited into the formula reservoir 145. In the formula reservoir, the mixed gas and water are further mixed with one or more formulas to form a mixture. The mixture then flows over (or through) the charged substrate 190, which enables coacervation of the mixture. The coacervated mixture, now containing a high concentration of coacervate molecules, is then dispensed out of the plurality of openings 140A, 140B, 140C . . . 140N onto a surface.

Figure 2A:
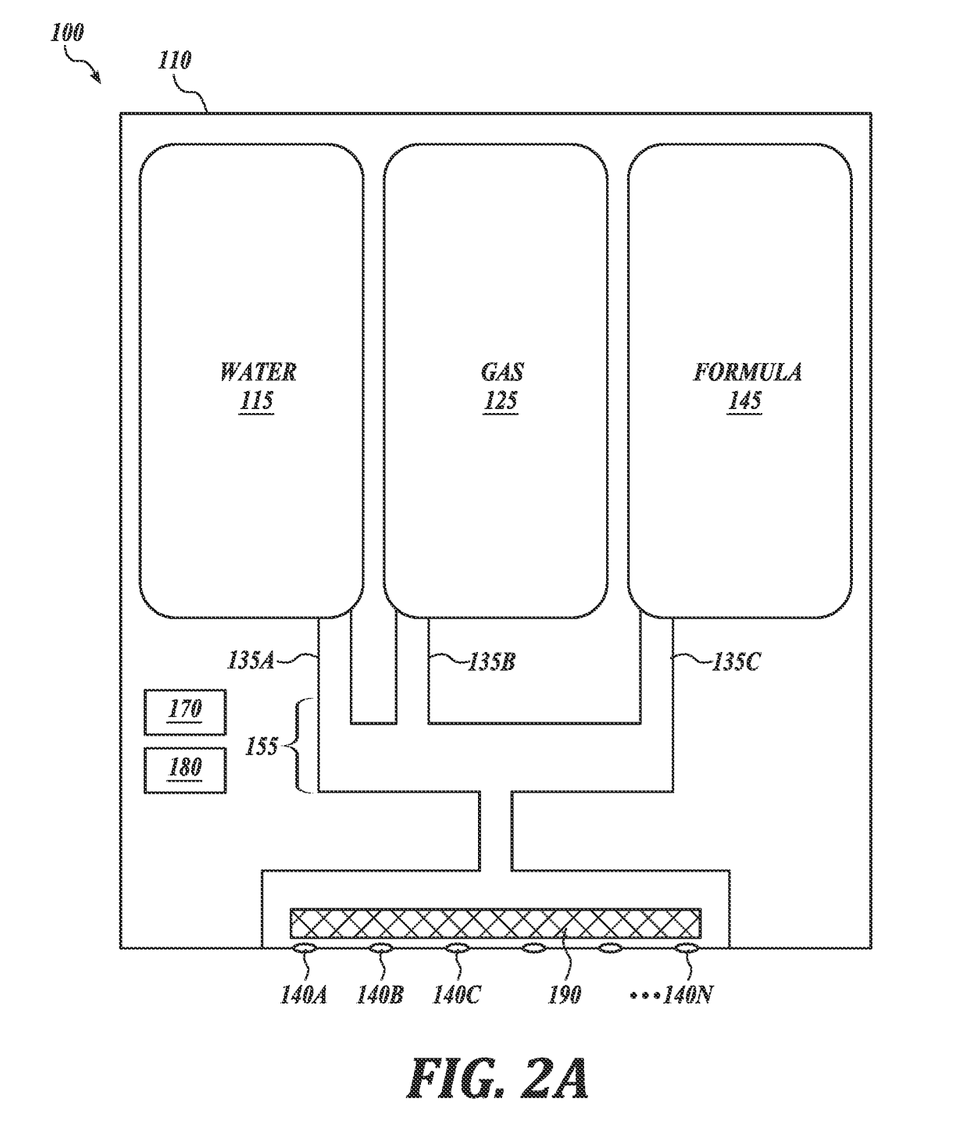

FIG. 2A is an internal view of another example device 100, in accordance with the present technology. In some embodiments, the formula reservoir 145 is connected to the mixing zone 155 through a third connection 135C. In such embodiments, the water, gas, and one or more formulas are all mixed simultaneously in the mixing zone 155 to form a mixture. The mixture then flows through or over the charged substrate 190.

Figure 2B:
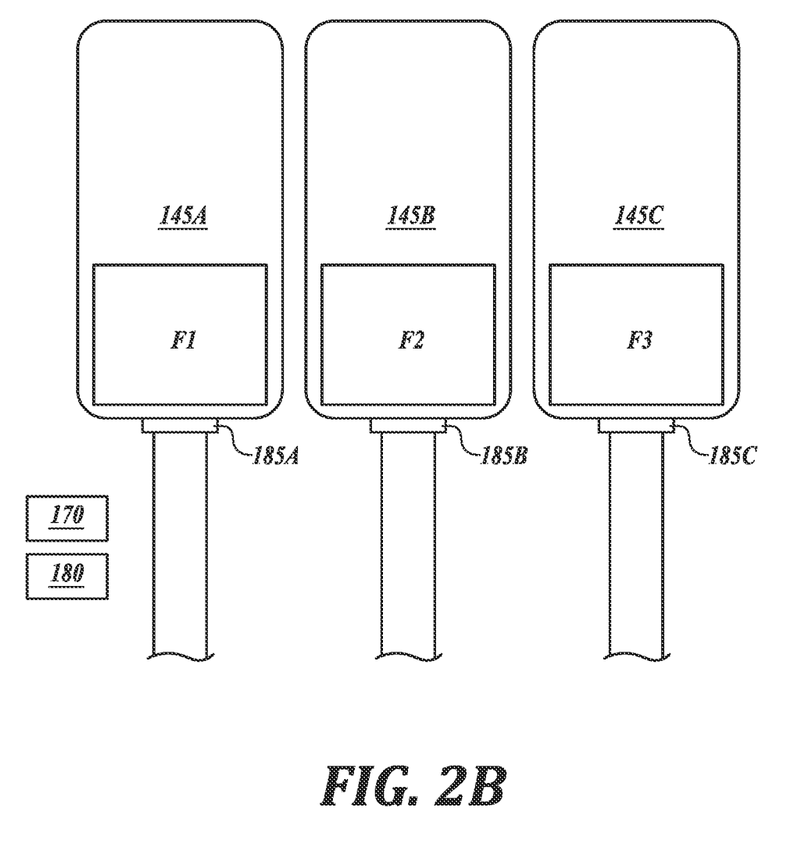

FIG. 2B shows a plurality of formula reservoirs 145A, 145B, 145C, in accordance with the present technology. In some embodiments, the formula reservoir 145 is a first formula reservoir 145A. In some embodiments, the device 100 includes a plurality of formula reservoirs 145A, 145B, 145C. In some embodiments, each formula reservoir is configured to contain a formula F1, F2, F3. While three formula reservoirs 145A, 145B, 145C holding three formulas F1, F2, F3, are illustrated it should be understood that any number of reservoirs holding any number of formulas may be included in device 100.

In some embodiments, each formula reservoir 145A, 145B, 145C includes a valve 185A, 185B, 185C. In some embodiments, each valve 185A, 185B, 185C is communicatively connected to the processor 180. In some embodiments, the processor 180 directs each valve 185A, 185B, 185C to open and close for a set amount of time, to dispense a specific amount of each formula F1, F2, F3 based on a recipe. In some embodiments, the recipe includes a specific amount for each formula F1, F2, F3 to create a desired mixture. In some embodiments, the desired mixture is a shampoo, conditioner, leave-in shampoo or conditioner, hair serum, or hair mask. In some embodiments, the valves 185A, 185B, 185C dispense the formulas F1, F2, F3 into a mixing zone (such as mixing zone 155). In some embodiments, the valves dispense the formulas F1, F2, F3 directly over the charged substrate 190 and through the openings 140A, 140B, 140C . . . 140N.

FIG. 3A is another example device 300, in accordance with the present technology. In some embodiments, the device 300 is handheld. In some embodiments, the device 300 can further be shaped like a shower head. In some embodiments, the device 300 includes an actuator 320, a first connection 335A, a second connection 335B and a plurality of openings 340A, 340B, 340C . . . 340N.

Figure 4:
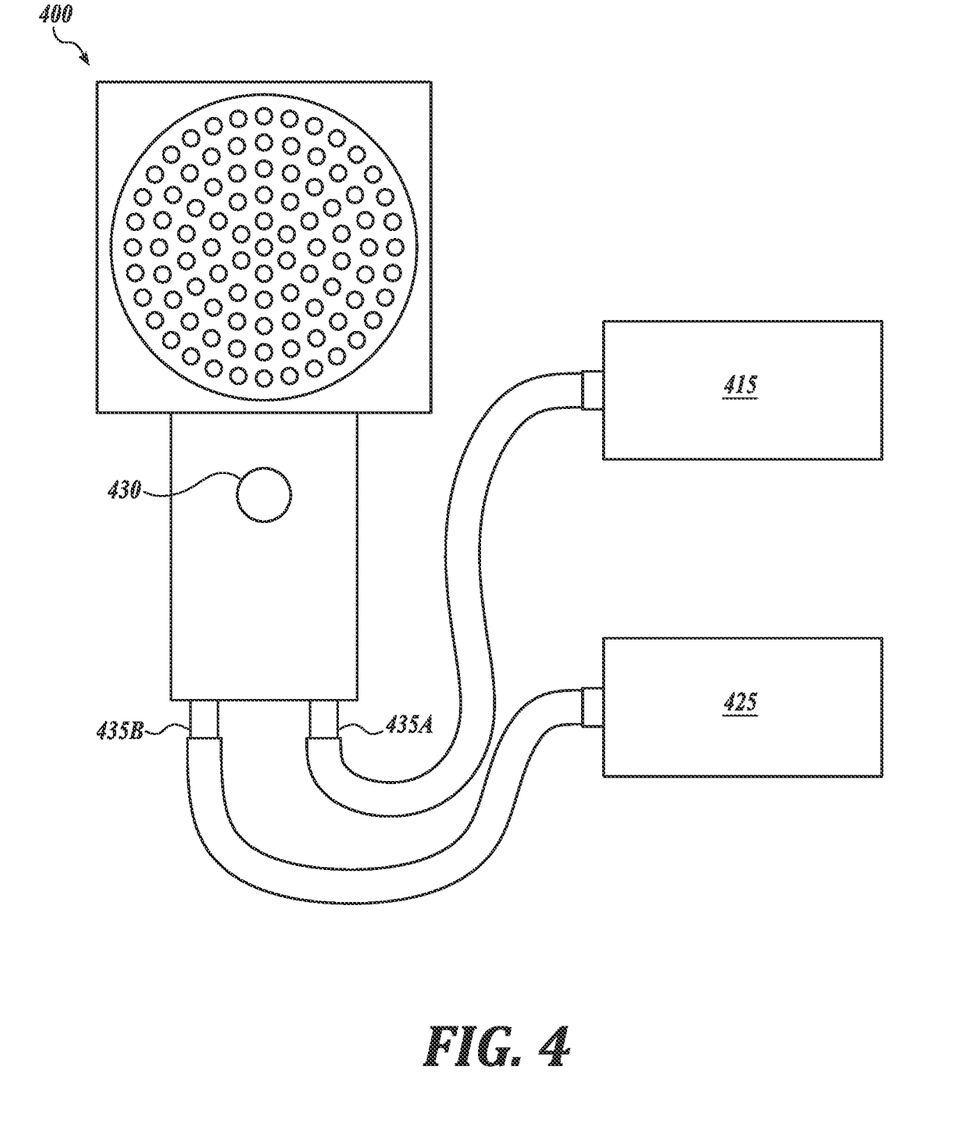

In some embodiments, the first connection 335A and the second connection 335B are disposed on the device, such as when a gas source, a water source, or both are not located inside the device 300. While the first and second connections 335A, 335B are illustrated as protruding from the device 300, in some embodiments, they may be recessed into the device 300 or flush with the device housing. In some embodiments, the first and second connections 335A, 335B are configured to attach to a water source and a gas source, respectively, either directly or with an additional adaptor as shown in FIG. 4. In some embodiments, the first and second connections 335A, 335B may be threaded, configured to snap onto the respective source, magnetized, or the like.

While the plurality of openings 340A, 340B, 340C . . . 340N are arranged in a circle, it should be understood that the plurality of openings can take any form or orientation. In some embodiments, the plurality of openings 340A, 340B, 340C . . . 340N are fluidly coupled with the internal components of the device 300 as shown in FIG. 3C.

FIG. 3B is a perspective view of the example device of FIG. 3A, in accordance with the present technology.

In some embodiments, the actuator 320 may protrude from the device 300, but it should be understood that the actuator 320 may also be flush with the device 300 or recessed. In operation, when a user presses the actuator 320, the device 300 takes in both water and gas through the first connection 335A and the second connection 335B, respectively.

FIG. 3C is an internal view of the example device of FIG. 3A, in accordance with the present technology. In some embodiments, the device 300 may include a formula reservoir 345, configured to hold one or more formulas F. In some embodiments, the formula F may be enclosed in a dissolvable membrane, such as is illustrated in FIG. 3C. In such embodiments, the dissolvable membrane may dissolve in response to the water and gas entering the formula reservoir 345. In some embodiments, the formula reservoir 345 may have an opening that allows a user to deposit or load the device 300 with the formula F.

In operation, when a user pressed the actuator 320, water and gas flow into the device 100 through the first and second connection 335A, 335B respectively. In some embodiments, the gas and water mix before entering the formula reservoir 345. In the formula reservoir 345, the gas and water mix with one or more formulas F. In some embodiments, the mixed gas, water, and formula form a mixture, and the mixture is dispensed onto a surface through the plurality of openings 340A, 340B, 340C . . . 340N after passing over or through a charged substrate 390. In some embodiments, the surface is hair, skin, or the hands of a user.

FIG. 4 shows the example device of FIG. 3A connected to an external water source 415 and an external gas source 425, in accordance with the present technology. In some embodiments, the device 400. In some embodiments, the device 400 is configured to attach to an external water source 415 and an external gas source 425. In some embodiments, the external water source 415 may be a water tank, a sink, or a shower post. In some embodiments, the external gas source 425 may be a $CO_2$ cartridge, a gas line, or the like.

In operation, a user can connect the first connection 435A to a water source 415, and the second connection 435B to a gas source 425. In some embodiments, the user may utilize another adaptor as illustrated, but in other embodiments, the user may connect the sources the device 400 directly.

Figure 5:
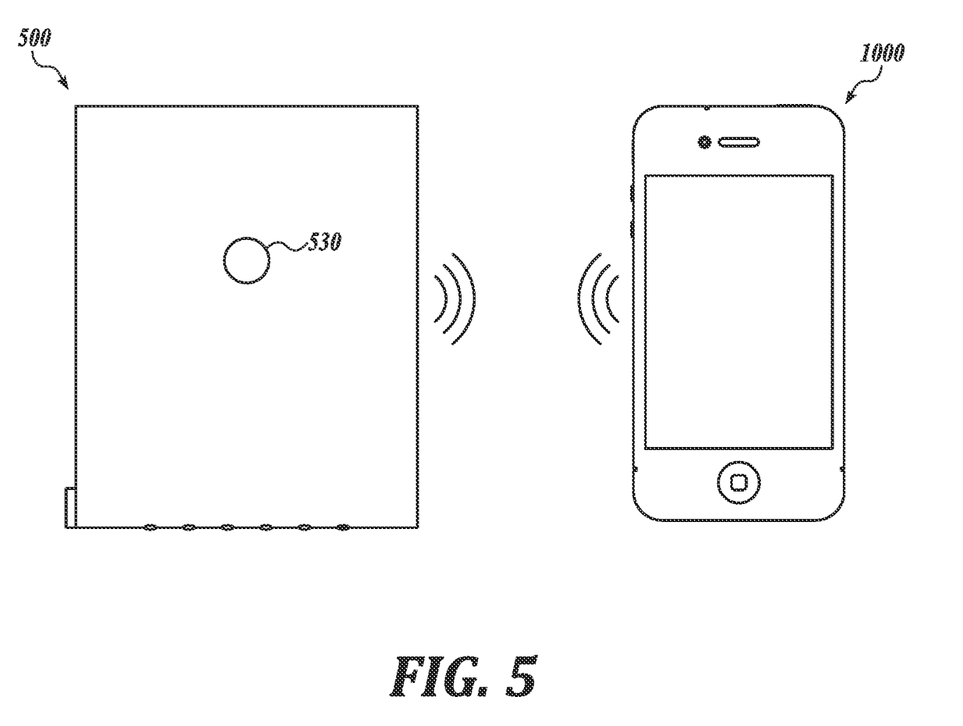

FIG. 5 is an example system, in accordance with the present technology. In some embodiments, a system including a device 500 (or any device 100, 200, 300, 400 as described herein) and a smart device 1000 is disclosed. In some embodiments, the device 500 and the smart device 1000 are communicatively coupled to one another, such as through Bluetooth LTE, cellular data, Wi-Fi, RFID, a wired connection, or the like.

In some embodiments, the smart device 1000 may include, in addition to or in place of actuator 530, an application that allows a user to direct the device 500 to create the mixture as described herein. In some embodiments, the smart device may provide the device 500 with a recipe including an amount of water, and amount of gas, and an amount of one or more formulas. In some embodiments, the user can select a formula or recipe with the smart device to determine the amounts of water, gas, and one or more formulas, as described in detail herein.

Figure 6:
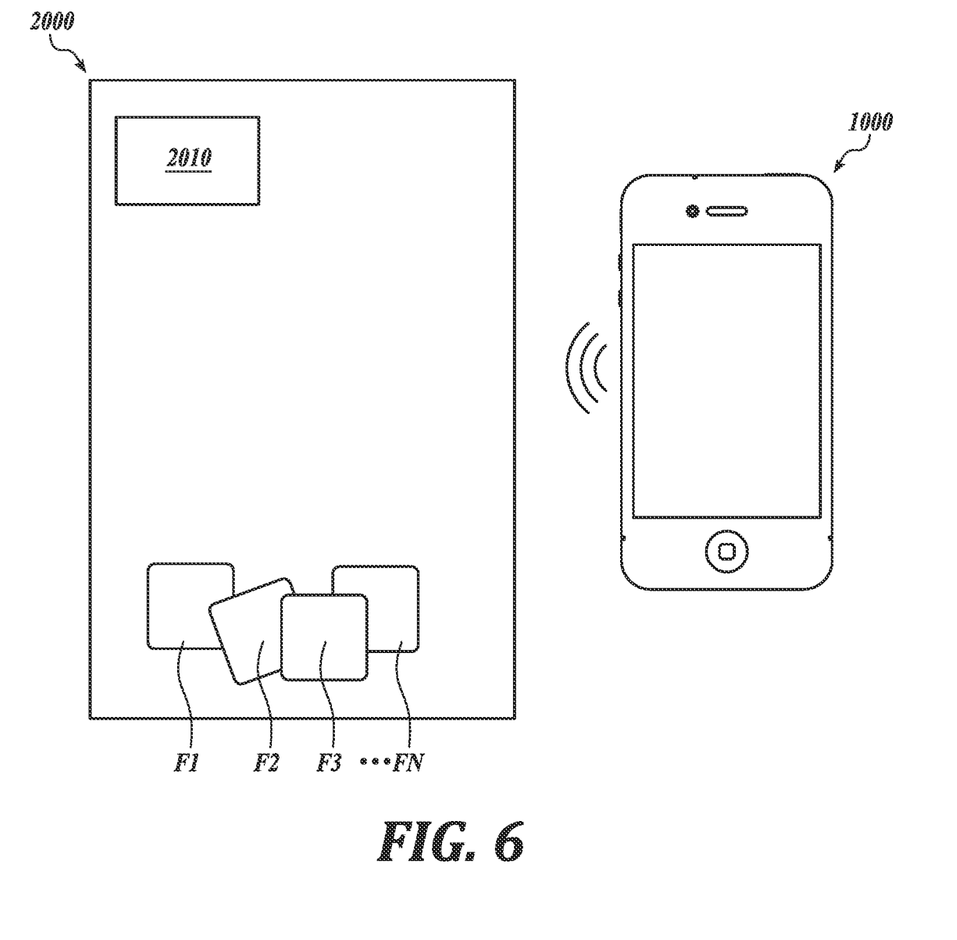

FIG. 6 is example formula F inside example packaging 2000, in accordance with the present technology. In some embodiments, the system further includes formula F1, F2, F3 . . . FN. In some embodiments, the formula F1, F2, F3 . . . FN is disposed within a packaging 2000. While the formula F1, F2, F3 . . . FN is illustrated as formula encapsulated in dissolvable membranes (or "pods"), the formula may also be a liquid, a solid, a gel, or the like. In some embodiments, the formula F1, F2, F3 . . . FN is a cosmetic ingredient. In some embodiments, the one or more formulas F1, F2, F3 . . . FN are active ingredients that when mixed with water and gas, form a shampoo, a conditioner, a leave-in shampoo or conditioner, a hair serum, or a hair mask.

In some embodiments, the packaging 2000 further includes an identifier 2010. In some embodiments, the identifier 2010 may be a QR code, an RFID tag, or the like. In operation, the identifier 2010 identifies the formula F1, F2, F3 . . . FN inside the packaging and can direct a smart device 1000 to tell the device 500 the recipe for creating the mixture. In some embodiments, the device 500 includes a component capable of reading the identifier, so that the device 500 receives the recipe directly. In some embodiments, the packaging 2010 may include more than one formula F1, F2, F3 . . . FN. In such embodiments, the identifier 2010 may include a recipe that is transmitted to the smart device 1000, and includes the amount of each formula F1, F2, F3 . . . FN that should be dispensed or mixed. In some embodiments, the smart device 1000 or the device 500 generates the recipe based on one or more identifiers 2010 on one or more packaging 2000. In some embodiments, the one or more formulas F1, F2, F3 . . . FN may be portioned in a manner consistent with the recipe. For example, a first formula F1 in the specific amount needed for the recipe may be contained in a dissolvable membrane, and a second formula F2 in a different specific amount needed for the recipe may be contained in a different dissolvable membrane, or in a separate chamber of the first dissolvable membrane. In such embodiments, a user could load the device with one pod of each formula F1, F2, or the combined pod with both portioned formulas F1, F2 to mix and dispense the desired formula. In some embodiments, the packaging 2000 may include a written recipe instructing the user to load the device with a set amount of each formula F1, F2, F3 . . . FN to create a desired mixture.

Figure 7:
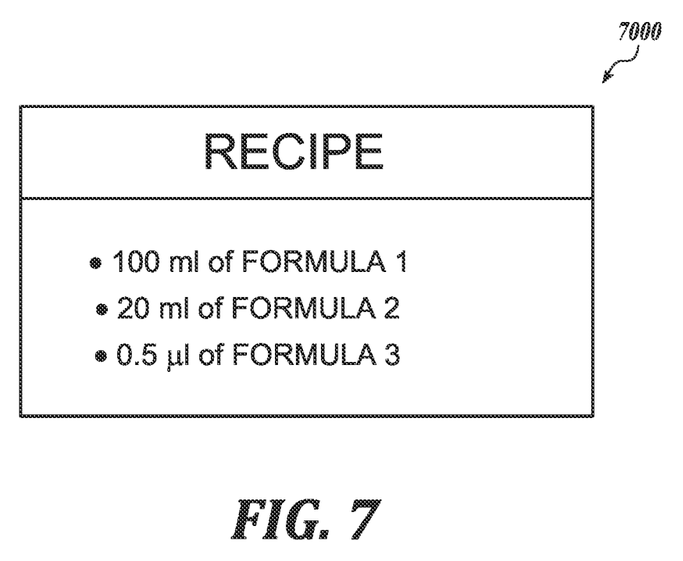

FIG. 7 is an example recipe, in accordance with the present technology. In some embodiments, the smart device, the device, or the packaging identifier generates a recipe for dispensing a mixture. In some embodiments, the recipe includes a set amount of one or more formulas. In some embodiments, the recipe further includes a set amount of gas, water, or both to form the mixture. For example, the recipe may instruct the device to apply one amount of a shampoo, another amount of an additional ingredient, such as a UV protecting ingredient, and a set amount of water and gas to form a shampoo with UV protecting properties. It should be understood that recipe 7000 is an example, and any number of formulas at any quantity can be generated. In some embodiments, the recipe 7000 is hardcoded into the processor of the device. In some embodiments, the recipe 7000 is selected by a user with the device of the smart device.

Figure 8:
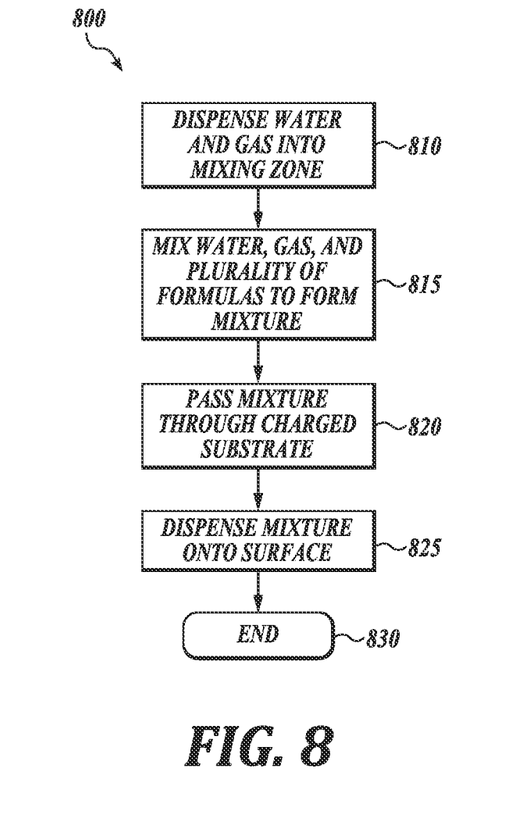

FIG. 8 is an example method 800 of dispensing a mixture, in accordance with the present technology. The method 800 begins in block 810, when water and gas are dispensed into a mixing zone. The water and gas may mix in a separate location or may mix as a result of flowing through the device. In some embodiments, the device actively mixes the gas and water, such as with a stirrer. In other embodiments, the gas and water mix together as they flow through the device. In some embodiments, the water and gas flow through a first and second connection, respectively, into the mixing zone.

In block 815, the water and gas are mixed with one or more formulas to form a mixture. As described herein, in some embodiments, the mixture is a shampoo or conditioner.

In some embodiments, the mixture is a leave-in shampoo or conditioner. In some embodiments, the mixture is a hair mask or hair serum.

In block 820, the mixture is passed through (or over) the charged substrate. In some embodiments, the charged substrate is a charged plastic covered in a metal net. In some embodiments, when the mixture is passed over the charged substrate, coacervation of the mixture occurs. In some embodiments, ions from the charged substrate 190 are generated from the heat exchange between the water and compressed gas on the charged surface 190. As such, in some embodiments, after passing over the charged substrate, the mixture of formula contains concentrated coacervated cationic actives.

In block 825, the mixture containing the coacervated cationic actives is dispensed onto a surface. In some embodiments, the surface is a user's hair. In some embodiments, the mixture containing the coacervated cationic actives benefits the user's hair. In some embodiments, the mixture allows for softer, smoother, and/or shinier hair. In some embodiments, the mixture reduces frizz in the user's hair. The method 800 then proceeds to block 830.

In block 830, the method 800 ends.

Figure 9:
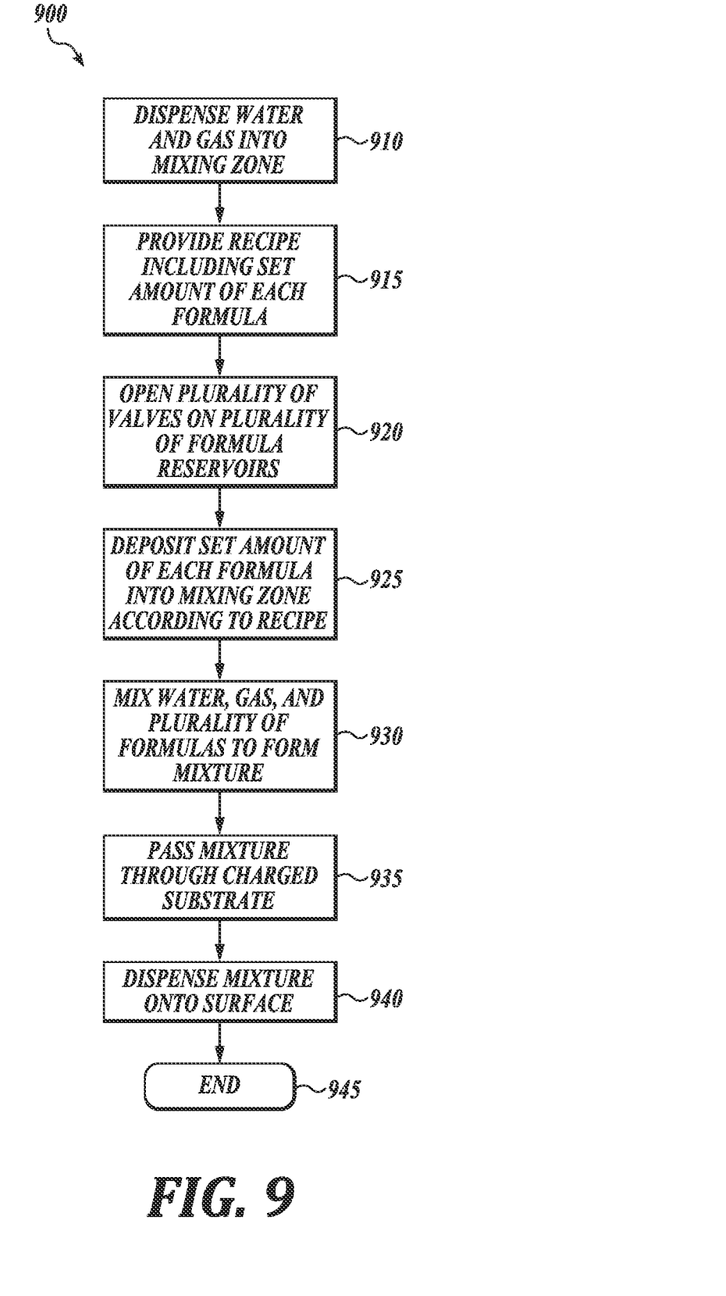

FIG. 9 is an example method 900 of dispensing a mixture according to a recipe, in accordance with the present technology. The method 900 begins in block 910. In block 910, water and gas are dispensed into a mixing zone. As described herein, the mixing zone may be a separate reservoir that allows the water and gas to mix, or an area where the water and gas naturally mix as they flow through the device.

In block 915, a recipe is provided, the recipe including a set amount of each formula needed for the recipe. In some embodiments, the recipe is provided by the device itself, the smart device, or the packaging of the one or more formulas. In some embodiments, the recipe directs the device to deposit a set amount of each formula in the recipe into the mixing zone, or over the charged substrate.

In block 920, the plurality of valves on the plurality of formula reservoirs. In some embodiments, the processor of the device directs the plurality of valves to open for to deposit the set amount of each formula. In some embodiments, the plurality of valves is configured to deposit formula for an amount of time, independent of each other.

In block 925, a set amount of each formula is deposited into the mixing zone, according to the recipe. In some embodiments, the set amount of each formula is passed directly over the charged substrate.

In block 930, the one or more formulas is mixed with water and gas to form a mixture. In some embodiments, the mixture is a shampoo or a conditioner. In some embodiments, the mixture may be a leave-in shampoo or conditioner. In some embodiments, the mixture is a hair mask or hair serum.

In block 935, the mixture is passed through or over the charged substrate. In some embodiments, by passing the mixture over the charged substrate, coacervation of the mixture occurs. In some embodiments, ions from the charged substrate 190 are generated from the heat exchange between the water and compressed gas on the charged surface 190. As such, in some embodiments, after passing over the charged substrate, the mixture of formula contains concentrated coacervated cationic actives.

In block 940, the mixture is dispensed onto a surface. In some embodiments, the surface is skin or hair.

In block 945, the method ends.

Figure 10:
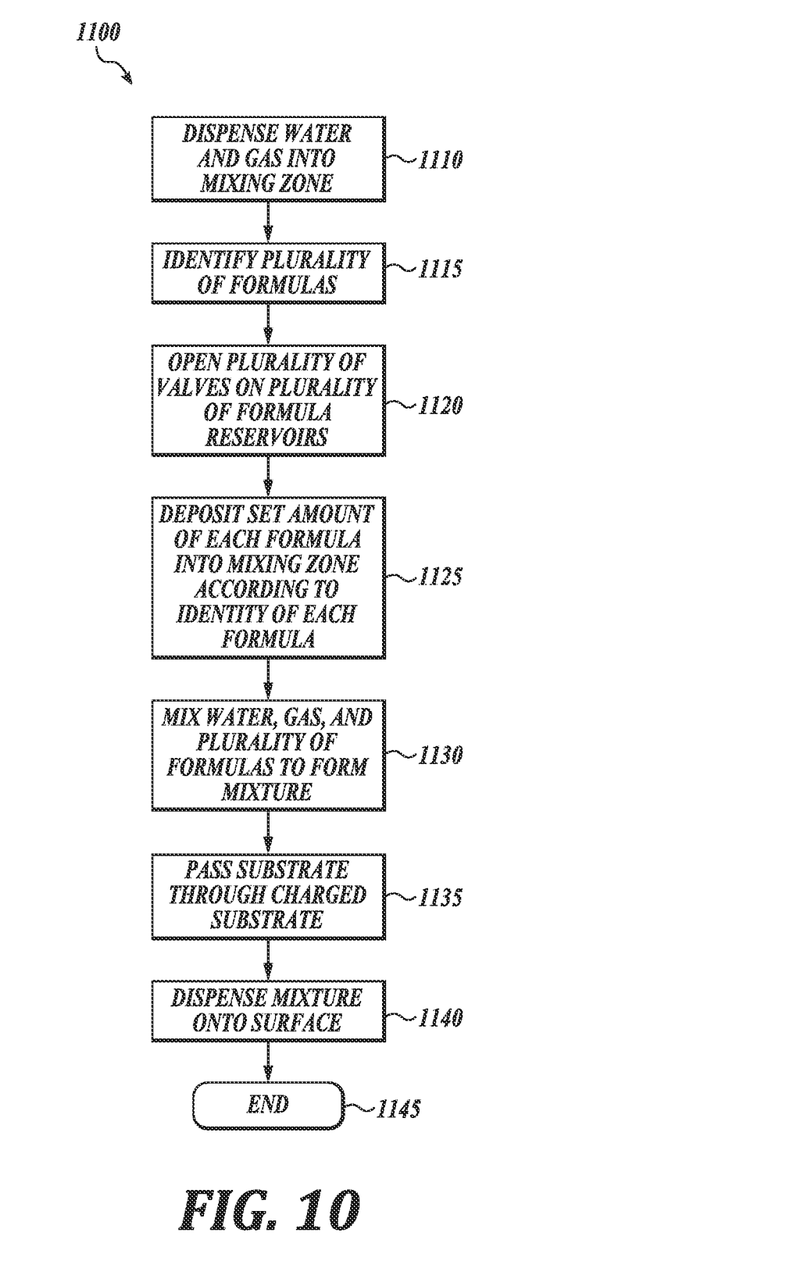

FIG. 10 is an example method 1100 of dispensing a mixture according to an identity of one or more formulas, in accordance with the present technology. The method 1100 begins in block 1110. In block 1110, water and gas are dispensed into a mixing zone, as described herein.

In block 1115, the plurality of formulas is identified. In some embodiments, the formula is identified by a packaging of the formula, or a packaging identifier configured to be read with a smart device. In some embodiments, the device is configured to identify the plurality of formulas. In some embodiments, the device is configured to select a mixture based on the identity of the plurality of formulas. In some embodiments, a user selects a mixture from a list of mixtures possible based on the plurality of formulas inside the device.

In block 1120, a plurality of valves on the plurality of formula reservoirs are opened. In some embodiments, the processor directs the plurality of valves to open for a set amount of time, so as to deposit a set amount of formula.

In block 1125, the set amount of formula is deposited into the mixing zone according to the identity of the plurality of formulas.

In block 1130, the one or more formulas is mixed with water and gas to form a mixture. In some embodiments, the mixture is a shampoo or a conditioner. In some embodiments, the mixture may be a leave-in shampoo or conditioner. In some embodiments, the mixture is a hair mask or hair serum.

In block 1135, the mixture is passed through or over the charged substrate. In some embodiments, by passing the mixture over the charged substrate, coacervation of the mixture occurs. In some embodiments, ions from the charged substrate 190 are generated from the heat exchange between the water and compressed gas on the charged surface 190. As such, in some embodiments, after passing over the charged substrate, the mixture of formula contains concentrated coacervated cationic actives.

In block 1140, the mixture is dispensed onto a surface. In some embodiments, the surface is skin or hair.

In block 1145, the method ends.

The order in which some or all of the blocks in the method should not be deemed to be limiting. Rather, one or ordinary skill in the art having the benefit of the present disclosure will understand that some of the blocks may be executed in a variety of orders not illustrated, or even in parallel.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate other embodiments within the scope of this disclosure may include structures and functionalities from more than one specific embodiment shown in the figures and described in the specification.

In the foregoing description, specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "vertical," "horizontal," "front," "rear," "left," "right," "top," and "bottom," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. The term "based upon" means "based at least partially upon."

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A dispensing device, comprising:
   a housing configured to surround the dispensing device;
   a first connection configured to connect to a water source;
   a second connection configured to connect to a gas source;
   a formula reservoir configured to hold one or more formulas;
   a mixing zone configured to mix water from the water source, and gas from the gas source, and formula from the formula reservoir into a mixture;
   a charged substrate configured to enable coacervation the mixture; and
   a plurality of openings fluidly coupled to the mixing zone, the opening configured to deposit a mixture of the one or more formulas, the gas, and the water onto a surface.

2. The dispensing device of claim 1, wherein the formula reservoir is located in the mixing zone.

3. The dispensing device of claim 1, wherein the formula reservoir comprises a valve, wherein the valve is configured to release an amount of the formula into the mixing zone.

4. The dispensing device of claim 3, wherein the formula reservoir is a first formula reservoir of a plurality of formula reservoirs and the valve is a first valve of a plurality of valves, wherein each formula reservoir of the plurality of formula reservoirs comprises a valve of the plurality of valves, and wherein each formula reservoir is configured to hold a formula of the one or more formulas.

5. The dispensing device of claim 4, wherein the dispensing device further comprises a processor communicatively coupled to the plurality of valves and configured to:
   direct each valve of the plurality of valves to dispense a specific amount of each formula of the one or more formulas into the mixing zone.

6. The dispending device of claim 5, wherein the processor is communicatively coupled to a smart device.

7. The dispensing device of claim 1, wherein the charged substrate is a charged plastic surrounded by a metal netting.

8. The dispensing device of claim 1, wherein the water source, the gas source, or both are disposed inside the housing.

9. The dispensing device of claim 1, wherein the dispensing device further comprises an actuator configured to direct the dispensing device to begin mixing the water, the gas, and the one or more formulas.

10. A dispensing system comprising:
    the dispensing device of claim 1; and
    one or more formulas.

11. The dispensing system of claim 10, wherein the one or more formulas are a liquid, a solid, a gel, a formula disposed within a dissolvable membrane, or combinations thereof.

12. The dispensing system of claim 10, wherein the one or more formulas are one or more cosmetic ingredients.

13. The dispensing system of claim 10, wherein the system further comprises a smart device communicatively coupled to the dispensing device, wherein the smart device is configured to generate a recipe comprising the one or more cosmetic ingredients.

14. The dispensing system of claim 13, wherein the one or more formulas is contained in a packaging, and wherein the packaging comprises an ID tag.

15. The dispensing system of claim 14, wherein the smart phone is further configured to read to ID tag, and determine the recipe based on an identity of the one or more formula.

* * * * *